(12) United States Patent
Asada et al.

(10) Patent No.: US 10,391,634 B2
(45) Date of Patent: Aug. 27, 2019

(54) APPARATUS AND METHOD FOR SUPPORTING A HUMAN BODY USING SUPERNUMERARY ARTIFICIAL LIMBS

(71) Applicant: Massachusetts Institute of Technology, Cambridge, MA (US)

(72) Inventors: Haruhiko Harry Asada, Lincoln, MA (US); Federico Parietti, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 285 days.

(21) Appl. No.: 15/310,860

(22) PCT Filed: May 16, 2014

(86) PCT No.: PCT/US2014/038398
§ 371 (c)(1),
(2) Date: Nov. 14, 2016

(87) PCT Pub. No.: WO2015/174998
PCT Pub. Date: Nov. 19, 2015

(65) Prior Publication Data
US 2017/0087721 A1    Mar. 30, 2017

(51) Int. Cl.
*G05B 15/00* (2006.01)
*G05B 19/00* (2006.01)
(Continued)

(52) U.S. Cl.
CPC ............ *B25J 9/1669* (2013.01); *A47C 9/025* (2013.01); *B25J 9/0009* (2013.01); *B25J 9/10* (2013.01);
(Continued)

(58) Field of Classification Search
CPC ............ A47C 9/025; A61H 2201/0173; A61H 2201/1246; A61H 2201/1623;
(Continued)

(56) References Cited

U.S. PATENT DOCUMENTS 7,190,141 B1   3/2007   Ashrafiuon et al. ...... 318/568.12
7,785,279 B2   8/2010   Sankai ........................... 601/5
(Continued)

FOREIGN PATENT DOCUMENTS

CN    102113949 A    7/2011    ............... A61H 1/00
CN    102846448 A    1/2013    ............... A61H 1/02
(Continued)

OTHER PUBLICATIONS

International Searching Authority, International Search Report and Written Opinion for PCT/US2014/038398, dated Oct. 10, 2014, 12 pages.

*Primary Examiner* — Harry Y Oh
(74) *Attorney, Agent, or Firm* — Sunstein Kann Murphy & Timbers LLP

(57) ABSTRACT

An apparatus includes at least one supernumerary artificial limb and a base structure configured to couple with a human body. The base structure includes a sensor that obtains a measurement regarding load of the human body. The proximal end of the supernumerary artificial limb is coupled to the base structure. The apparatus further includes a processor operatively coupled with the sensor and configured to receive the measurement from the sensor. The processor is also configured to generate a control signal to change at least one of a position of the supernumerary artificial limb and a torque exerted by the supernumerary artificial limb based on the measurement regarding the load.

18 Claims, 21 Drawing Sheets

(51) Int. Cl.
  *B25J 9/16* (2006.01)
  *A47C 9/02* (2006.01)
  *B25J 9/00* (2006.01)
  *B25J 9/10* (2006.01)
  *A61H 3/00* (2006.01)
  *A63B 27/00* (2006.01)

(52) U.S. Cl.
  CPC ........ *A61H 3/00* (2013.01); *A61H 2201/0173* (2013.01); *A61H 2201/1246* (2013.01); *A61H 2201/165* (2013.01); *A61H 2201/1623* (2013.01); *A61H 2201/1628* (2013.01); *A61H 2201/5061* (2013.01); *A61H 2201/5069* (2013.01); *A61H 2201/5084* (2013.01); *A61H 2201/5092* (2013.01); *A61H 2230/60* (2013.01); *A63B 27/00* (2013.01); *A63B 2220/52* (2013.01); *Y10S 901/02* (2013.01); *Y10S 901/15* (2013.01)

(58) Field of Classification Search
  CPC ...... A61H 2201/1628; A61H 2201/165; A61H 2201/5061; A61H 2201/5069; A61H 2201/5084; A61H 2201/5092; A61H 2230/60; A61H 3/00; A63B 2220/52; A63B 27/00; B25J 9/0009; B25J 9/10; B25J 9/1669; Y10S 901/02; Y10S 901/15
  See application file for complete search history.

(56) References Cited

U.S. PATENT DOCUMENTS

| | | | |
|---|---|---|---|
| 7,947,004 B2 | 5/2011 | Kazerooni et al. | 602/16 |
| 8,177,733 B2 | 5/2012 | Ashihara et al. | 601/35 |
| 2004/0026584 A1 | 2/2004 | Libbey et al. | 248/278.1 |
| 2009/0210093 A1 | 8/2009 | Jacobsen et al. | 700/260 |
| 2010/0204804 A1* | 8/2010 | Garrec | A61H 1/0277 623/24 |
| 2011/0264016 A1 | 10/2011 | Han et al. | 601/35 |
| 2011/0266323 A1 | 11/2011 | Kazerooni et al. | 224/575 |
| 2013/0158444 A1 | 6/2013 | Herr et al. | 601/23 |
| 2014/0121520 A1* | 5/2014 | Wang | A61B 8/403 600/444 |

FOREIGN PATENT DOCUMENTS

| | | | | |
|---|---|---|---|---|
| WO | WO 2011/127421 A1 | 10/2011 | | B66D 1/00 |
| WO | WO 2012/154580 A1 * | 5/2012 | | |
| WO | WO 2012/154580 A1 | 11/2012 | | E05D 13/00 |

\* cited by examiner the robot increases the stability of the human during walking support polygon of the human and robot support polygon of the human alone

APPARATUS AND METHOD FOR SUPPORTING A HUMAN BODY USING SUPERNUMERARY ARTIFICIAL LIMBS

TECHNICAL FIELD

The present invention relates to a device with supernumerary artificial limbs that may be positioned based on a load of a human body. In particular, the device may operate the limbs to support, brace, or stabilize the human body, based on the load.

BACKGROUND ART

Freestanding devices have been used for many years to support a human body. For example, the elderly may use canes or walkers to prevent themselves from falling when they move. They do not attach or couple any portion of these devices to their bodies, and furthermore, successful use of these devices depends on the users' abilities. The user must position the cane or walker based on where the user subjectively believes the device will benefit him or her. Further, should the user's strength falter, the device cannot prevent the user from falling. In this manner, these freestanding devices provide limited assistance to their users.

Robotic exoskeleton suits also have been used to supplement healthy or weakened limbs on a human body. When a user wears an exoskeleton, the device often attaches along the entire lengths of the user's limbs, physically abutting the user's entire limbs. Due to this physical coupling, the exoskeleton's positions are constrained entirely by the chosen movements of the user. Further, when the exoskeleton compensates for its weight and the user's weight, the exoskeleton must do so beginning from the joint angles (e.g., knees, ankles) of the user's posture. Undesirably, these requirements cause the exoskeleton to consume a significant amount of power.

SUMMARY OF VARIOUS EMBODIMENTS

In accordance with one embodiment of the invention, an apparatus includes at least one supernumerary artificial limb and a base structure configured to couple with a human body. The base structure includes a sensor that obtains a measurement regarding load of the human body. The proximal end of the supernumerary artificial limb is coupled to the base structure. The apparatus further includes a processor operatively coupled with the sensor and configured to receive the measurement from the sensor. The processor is also configured to generate a control signal to change at least one of a position of the supernumerary artificial limb and a torque exerted by the supernumerary artificial limb based on the measurement regarding the load.

The processor may also be configured to generate the control signal to position the supernumerary artificial limb for bracing, supporting, or stabilizing the human body.

In some embodiments, the proximal end of the supernumerary artificial limb and the base structure are coupled with a ball joint. Among other things, the supernumerary artificial limb may include a rotational joint and a prismatic joint. The distal end of the supernumerary artificial limb may include a hook or a frictional end surface. The supernumerary artificial limb may also include an actuator that receives the control signal from the processor and actuates a joint to change the position of the supernumerary artificial limb based on the signal. For example, the actuator may actuate a rotational joint to change an angle of the rotational joint. In another example, the actuator may actuate a prismatic joint to change an extension of the supernumerary artificial limb. Further, the actuator may actuate a joint to exert an amount of torque, based on the control signal from the processor.

In accordance with another embodiment of the invention, a method supplements a human body with a supernumerary artificial limb. To that end, the method receives a measurement regarding a load of a human body and, based on that measurement, determines at least one of a position for a supernumerary artificial limb and a torque to be exerted by the supernumerary artificial limb to support at least a part of the load. The method then sends a control signal based on the determined position or torque.

In some embodiments, the measurement regarding a load is associated with a joint angle of a limb of the human body, a position of a center of mass of the human body, a force exerted at a location on the human body, or any combination thereof.

The method may determine the position or torque for a supernumerary artificial limb for bracing, supporting, or stabilizing the human body. In various embodiments, the method may determine the position for which force exerted from contact of a distal end of the supernumerary artificial limb against an environment is directed into a center of a ball joint of the supernumerary artificial limb, thereby preventing rotation of the ball joint. The method may determine a plurality of possible positions for the supernumerary artificial limb. In these possible positions, the distal end of the supernumerary artificial limb would contact a surface of an environment when the supernumerary artificial limb is moved into the possible position. The method may also select a position from the plurality of possible positions.

The method may determine, based on a center of mass of the human body and at least a position of a limb of the human body, a position of the supernumerary artificial limb. Further, the method may determine, for each position in a plurality of possible positions for the supernumerary artificial limb, an amount of support provided to a center of mass of the human body by the particular position of the supernumerary artificial limb and a position of a limb of the human body. The method may select the position associated with the largest amount of support.

In some embodiments, the method may determine, for each position in a plurality of possible positions for the supernumerary artificial limb, a region of support for a center of mass of the human body. The region of support may be bounded by the particular position of the supernumerary artificial limb and a position of a limb of the human body. The method may select the position associated with a region of support with the largest area.

Additionally, the method may determine at least one of a force and a torque exerted at a location on the human body. The force may correspond to a force required by the human body to maintain the body in a posture. The method may also determine, for each position in a plurality of possible positions for the supernumerary artificial limb, an amount of the force that would be provided by the supernumerary artificial limb if the supernumerary artificial limb were moved into the position. Further, the method may select the position associated with the largest amount of provided force. In many embodiments, the method may determine an amount of torque and force required to maintain the body in the posture.

In some embodiments, the method may send the control signal to an actuator that actuates a rotational joint of the supernumerary artificial limb. Alternatively, the actuator may actuate a prismatic joint of the supernumerary artificial limb.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Illustrative embodiments support the load of a human body. For example, among other things, illustrative embodiments may assist the user by supporting, bracing, or stabilizing his or her body. To that end, such embodiments include devices that position supernumerary artificial limbs to support at least part of the human body's load. The artificial limbs couple to a base structure at one of the limbs' ends, but they are not coupled to the user's natural limbs at various locations along their lengths. As a result, the devices are free to position the artificial limbs independently of the postures of the user's limbs. Put another way, the artificial limbs are kinematically independent of the user's natural limbs.

This independence provides a number of advantages over the prior art. First, the device may consider a wider range of possible positions for the artificial limbs and determine the position(s), and requisite torques, that support as much of the human body's load as possible. Further, since the artificial limbs are not required to assume the joint angles of the user's body, the artificial limbs may support the load from positions that require less torque, thereby reducing the device's power consumption relative to conventional artificial exoskeletons.

Such devices contemplate numerous applications. For example, the device may stabilize a user's balance while walking and reduce the likelihood that the user may fall. If the user's strength falters, the device may reposition the artificial limbs to support the user's body. In another application, the device enables the user to maintain an otherwise fatiguing posture for an extended period of time. Further, the device may brace a user's body, or anchor the user's body to a structure. In these applications, the device may position the artificial limbs so that effectors on the limbs engage with objects in the user's immediate environment. For example, the limbs may have hooks that can hook over a railing, or clamps that grip a bar on a nearby structure. The points of contact stabilize the user's body, and in some contexts reduce the likelihood that the user will fall. In any of these applications, as the user moves, the device may re-evaluate the load of the user's body and update the positions and/or torques of the supernumerary artificial limbs.

Figure 1:
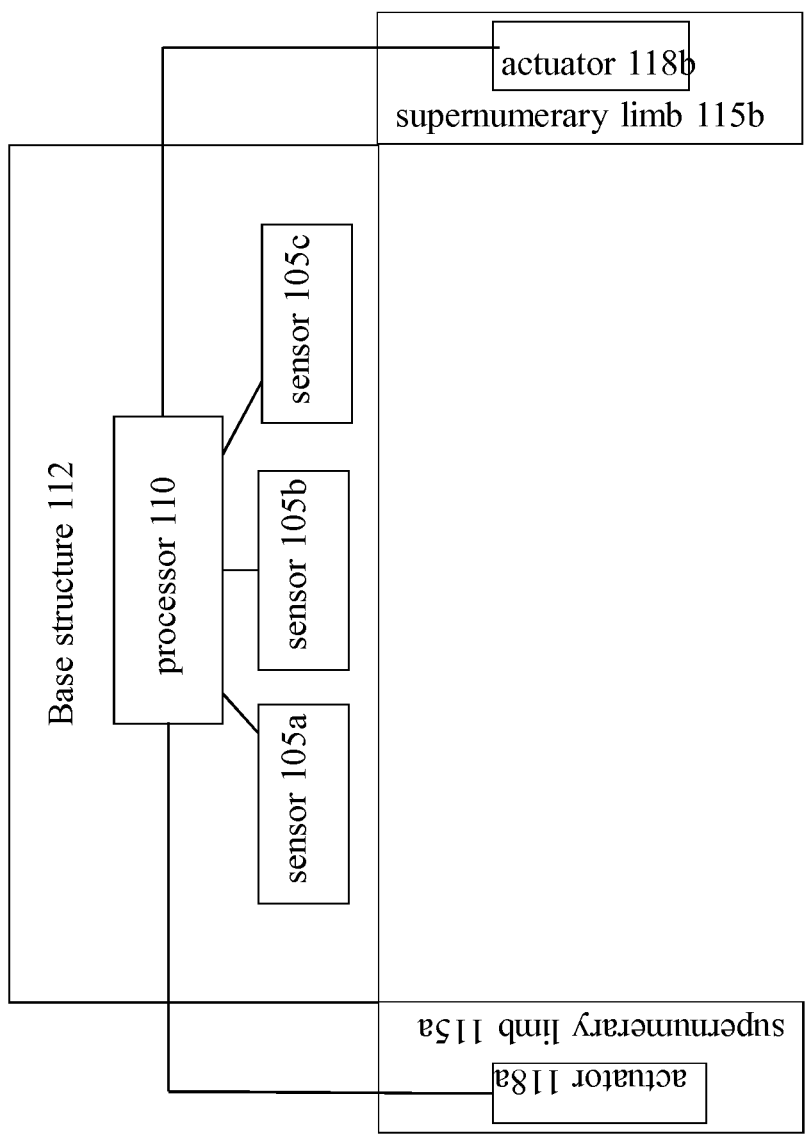
FIG. 1 depicts a schematic drawing of a device that supports a human body using supernumerary artificial limbs.

FIG. 1 depicts a schematic drawing of a device 100 that supports the load of a human body using supernumerary artificial limbs. The device 100 includes a base structure 112 with sensors 105a, 105b, 105c (collectively, "105") that, together with a processor 110, sense various data regarding a load of a human body. The base structure 112 and processor 110 are coupled to the supernumerary artificial limbs 115 and their respective actuators 118. In some embodiments, the proximal ends of the limbs 115 are coupled to the base structure 112.

When the user wears the device 100, the sensors 105 measure and forward various metrics regarding the load of the user's body to the processor 110. For each possible position for an artificial limb 115, the device 100 determines the extent and manner in which the artificial limb 115 would assist the human body in bearing the load. For example, the processor 110 may determine an aggregate measure of forces and torques that the artificial limb 115 would exert in a particular position (e.g., the aggregate of forces and torques exerted by each joint of the limb 115). Then, the processor 110 may determine an aggregate measure of the residual forces and torques that the user would still need to exert if the limb 115 were moved into that position and exerted the particular forces and torques. In some embodiments, the processor 110 may also determine if the force and/or torque exerted from contact of a distal end of the supernumerary artificial limb 115 against an environment, in that particular position, would be directed into a center of a joint coupling the artificial limb 115 to the base structure 112, thereby preventing rotation of the this joint. This process may be repeated for all of the supernumerary artificial limbs 115 attached to the base structure 112. The processor 110 may select the positions, forces, and torques for the artificial limbs 115 that result in the largest reduction of exertion required by the user.

Based on these positions, the processor 110 forwards control signals to the actuators 118 of the supernumerary artificial limbs 115. In response, the actuators 118 position the supernumerary artificial limb 115 and operate the limb 115 to exert and maintain particular amounts of force and torque. Further, the sensors 105 continually monitor the load of the user's body, and as a result, the processor 110 and actuators 118 continually update supernumerary artificial limbs 115, repositioning the limbs 115 or adjusting the amounts of force and torque that they exert.

Each sensor 105 may detect a different metric related to the load of the human body. For example, a sensor 105 may be configured to determine the angle of a joint of a part of the human body (e.g., wrist, elbow, knee, angle, shoulder, hip). Further, a sensor 105 may obtain information regarding a position of a center of mass of the human body, or the position of a center of mass of the human body and the device 100. Additionally, a sensor 105 may measure the load distribution under the user's body.

In some embodiments, a sensor 105 may be an encoder that measures deflection to sense torque exerted at a location. Another sensor 105 may measure the angle of the human torso relative to an x-axis of the environment. Other sensors 105 may measure a force exerted at a location on the human body, such as a user's hip. In another embodiment, a sensor 105 may include an inertial sensor, such as a MEMS accelerometer or a MEMS gyroscope, whose output indicates movement of the user's body. Further sensors 105 may obtain information about the user's balance. Exemplary sensors 105 may also obtain information related to the frequency and direction of a user's steps while in motion.

Further, the sensors 105 may include electromyography (EMG) sensors. These sensors 105 may include electrodes configured to be coupled to a user's skin and to measure voltages thereon. In this manner, EMG sensors 105 may record data related to muscle activation. The device 100 may include any of the sensors 105 described herein, in any combination. Further, the device 100 may include any number and combination of sensors 105 described herein, as desired.

The sensor 105 may send output signals to the processor 110 via any medium conventionally used in the art, such as wireless or wired media. For example, the sensor 105 may include a wire that connects output ports of the sensor 105 with the processor 110. In another example, a sensor 105 may be equipped with a wireless communicator. In that case, the sensor 105 may send wireless output signals to the processor 110 according to any protocols that would be appreciated by one of ordinary skill in the art.

Figure 2:
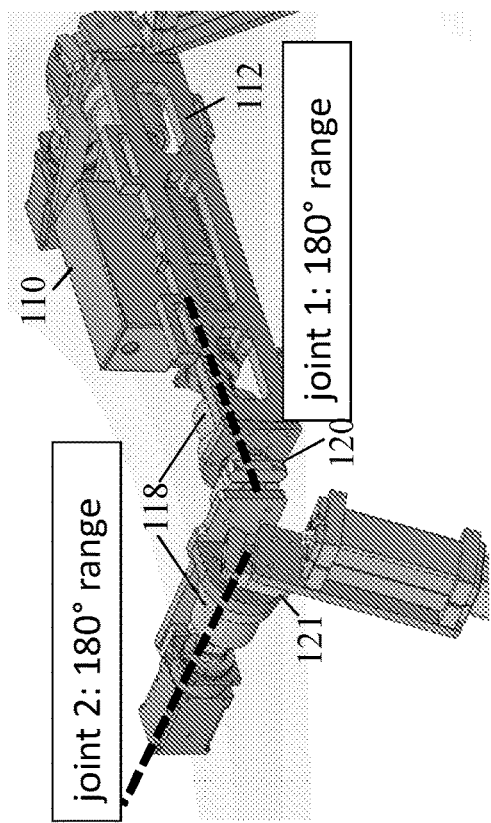
FIG. 2 depicts an exemplary base structure for use in the device described in FIG. 1.

In various embodiments, the device 100 operates an artificial limb 115 by forwarding, from the processor 110, one or more control signals to actuators 118 in the limb 115. Each actuator 118 may be coupled to a different joint in the limb 115. The limb 115 may include one or more joints that enable the limb 115 to be oriented in three-dimensional space. For example, a supernumerary artificial limb 115 may be coupled to the base structure 112 via two revolute joints 120 and 121, as depicted in FIG. 2. In this embodiment, one of the revolute joints 120 permits rotation of 180 degrees relative to an x-axis, while the other revolute joint 121 permits rotation of 180 degrees relative to a perpendicular axis.

However, joints that permit other ranges of rotation may be used. For example, in some embodiments, the revolute joint 120 (e.g., a shoulder flexion joint) may permit rotation of 270 degrees whereas the revolute joint 121 (e.g., a shoulder abduction joint) may permit rotation within 90 degrees. In another example, the limb 115 may be coupled to the base structure 112 via a ball joint, which also permits rotation of the limb 115 in three-dimensional space. For example, the joint may permit a 270-degree range of motion. In any of these embodiments, the joints preferably permit ranges of motion that enable the distal ends of the artificial limbs 115 to reach most of the workspace encompassed by the user's limbs (e.g., arms, legs). In some embodiments, a revolute joint 120 may exert torque up to about 69 Nm, although joints capable of exerting other torques may be used. Exemplary actuators 118 for the revolute joints 120, 121 include brushless direct current (DC) motors in gearboxes, manufactured by Harmonic Drive LLC of Peabody, Mass.

Figure 3:
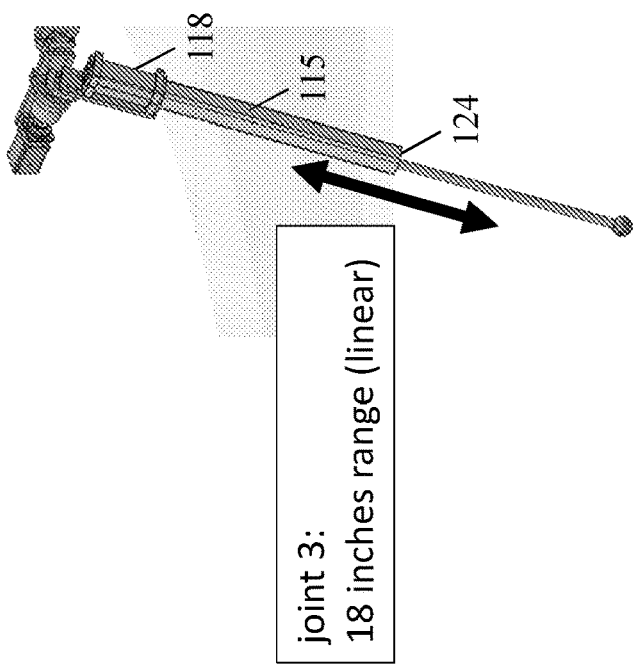
FIG. 3 depicts an exemplary supernumerary artificial limb for use in the device described in FIG. 1.

The limbs 115 may also include one or more joints that enable different parts of the limb 115 to be extended or contracted, thereby changing the effective length of the overall limb 115. For example, the limb 115 may effectively be configured to operate in a manner similar to a telescope. The device 100 thus may include appropriate structure for such functionality, such as a prismatic joint 124 that couples one section of the limb 115 to another. As depicted in FIG. 3, actuating this prismatic joint 124 may extend a section of the artificial 115 to protrude up to 18 inches from the other section. In further embodiments, the limb 115 may include multiple sections, prismatic joints, and associated actuators. For example, the limb 115 may include two or more cylinders that share the same central axis. The cylinders may have different diameters, and they may be arranged so that cylinders with small diameters may fit within cylinders with larger diameters. Put another way, the cylinders may be concentric. Each prismatic joint 124 may couple two cylinders that are concentrically adjacent to one another, and each joint 124 may be coupled to an actuator 118 that receives control signals from the processor 110. Based on these signals, the actuators 118 may extend or retract different sections of the limb 115 to control its overall length.

In various embodiments, an artificial limb 115 has a one or more revolute joints 120, 121 and a prismatic joint 124, each coupled to their respective actuators 118. The processor 110 may send separate control signals to the actuators 118. One or more actuators 118 may rotate one end of the artificial limb 115 within a three-dimensional space (e.g., 360 degrees, 270 degrees) to orient the limb 115, and another actuator 118 may extend or retract a section of the limb 115 so that the limb 115 reaches a final, desired position. However, the device 100 may include any number of revolute joints 120, 121 capable of rotating through various degrees of motion and any number of prismatic joints 124 as would be desired by one of ordinary skill in the art.

Additionally, the device 100 may operate the artificial limbs 115 to exert and maintain particular levels of force and/or torque at their respective positions. For example, the processor 110 may forward one or more control signals to any of the limb's 115 actuators 118. After an actuator 118 operates a joint to position the limb 115, the actuator 118 may further operate the joint to exert a particular amount of force and/or torque, based on the control signal. In some embodiments, the artificial limb 115 includes a sensor 105 that measures pressure exerted against the distal end. This sensor 105 may forward information about the pressure to the processor 110, and the processor 110 may update the control signal to adjust the force and/or torque that the limb 115 exerts.

Figure 4:
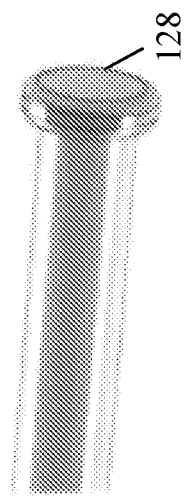

The distal end of an artificial limb 115 may include an object that aids the limb 115 in supporting the human body's load, such as a removable or permanently connected end effector. The end effector may be any device that enables the artificial limb to create and maintain a firm contact with a surface of the immediate environment. For example, the end effector may have a high coefficient of friction, which enables the limb 115 to exert a force against such a surface. This end effector may have any form factor, such as a cap 128 with a frictional end surface, as depicted in FIG. 4, or a sphere. The end effector may include any material with a high coefficient of friction, such as rubber. The limb 115 also may be configured to be coupled to removable and replaceable end effectors. Thus, a user may remove a cap 128 from the limb 115 and replace it with a sphere or any other end effector.

Figure 5:
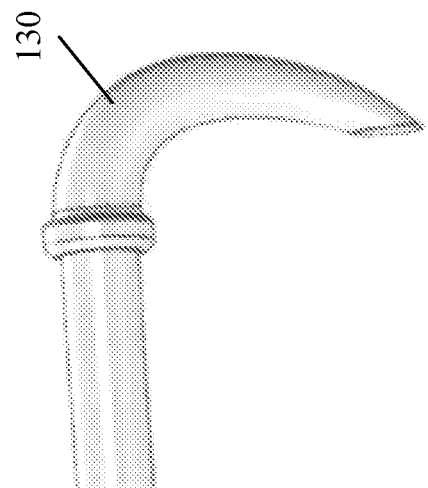
FIGS. 4-6 depict exemplary end effectors capable of being coupled to the distal ends of the supernumerary artificial limbs described in FIG. 1.

In some embodiments, the limb 115 may include a gripper at its distal end, such as a hook 130, as depicted in FIG. 5. In applications where the hook 130 needs to grip an object (e.g., a rung on a ladder), moving the limb 115 directly into the final position may fail to achieve the desired contact. Instead, the processor 110 may send a series of control signals to the actuators 118 so that the limb 115 approaches the final position in a manner that positions the hook 130 around its target object. For example, the actuator 118 may first lift the hook 130 above the rung, extend the limb 115 beyond the rung itself, and then lower the hook 130 and retract the limb 115 so that the hook 130 engages the rung.

Figure 6:
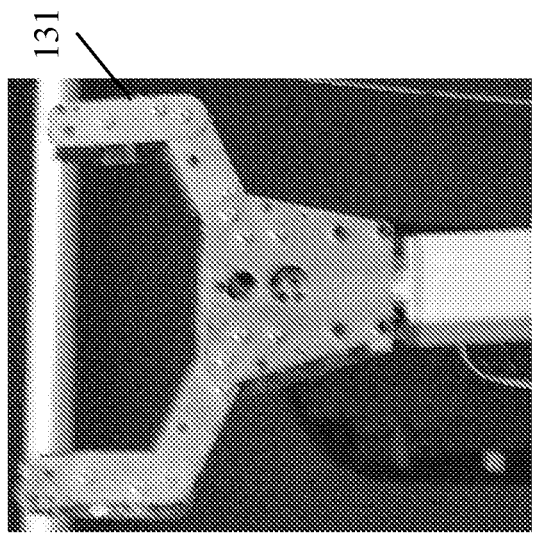

Alternatively, the limb 115 may include an actuated gripper, such as the gripper 131 depicted in FIG. 6. The limb 115 may include an actuator 118 coupled to the processor 110 and the gripper 131. Based on control signals from the processor 110, the actuator 118 may close the gripper 131 to secure it to an object (by grasping the object, by way of example), and open the same to release the limb 115 for repositioning. As with the embodiments with the hooks 130, the processor 110 may send a series of control signals to open the gripper 131 as the limb 115 approaches the desired object, and to close the gripper 131 once the limb 115 reaches the final position.

Although the device 100 of FIG. 1 depicts two supernumerary artificial limbs 115, a device 100 may include any number of limbs 115. For example, a device 100 may include a single limb 115. In some embodiments, the device 100 may include one or more pairs of supernumerary artificial limbs 115. Further, FIG. 1 schematically depicts the base structure 112 as a rectangular box, with the two limbs 115 coupled to opposite sides of the box. However, the base structure 112 may have any shape or configuration desired by one of ordinary skill in the art. For example, the base structure 112 may include a surface that follows the shape of a human's hip. Alternatively, the base structure 112 may include a flexible tube configured to be aligned with a user's spine.

Additionally, the limbs 115 may be coupled to the base structure 112 at any desired position. In some embodiments, artificial limbs 115 are positioned along the length of the base structure 112. Thus, if a base structure 112 is a flexible tube that aligns with the user's spine, supernumerary artificial limbs 115 may be positioned on the tube to couple each limb 115 to a different location on the user's spine. In some embodiments, two artificial limbs 115 may be coupled to the structure 112 at the same position, and they may be arranged so that when a user wears the base structure 112, one limb 115 extends to the user's right and the other extends to the user's left. Other examples of base structures 112 with different form factors and varying numbers of artificial limbs 112 coupled to different positions of the base structures 112 are also contemplated herein.

Further, although the device 100 is described as having a single processor 110, the device 100 may include any number of processors 110. Among other things, the processors 110 may include a single core or multiple cores. The device 100 may use any number or type of processor 110 capable of executing the control algorithm for the supernumerary artificial limbs 115.

Figure 7:
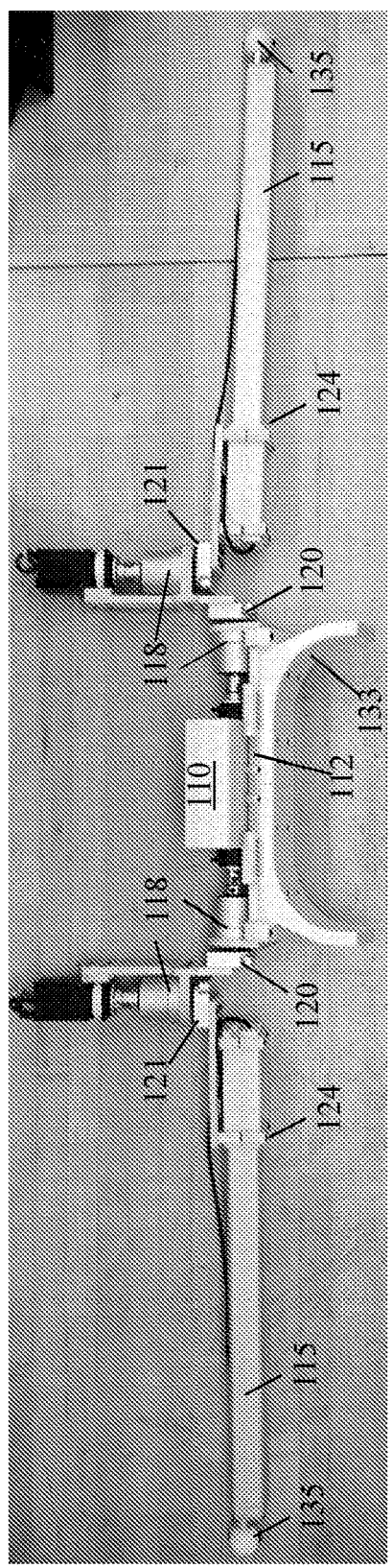
FIGS. 7-9 depict exemplary embodiments of the device described in FIG. 1.
Figure 8:
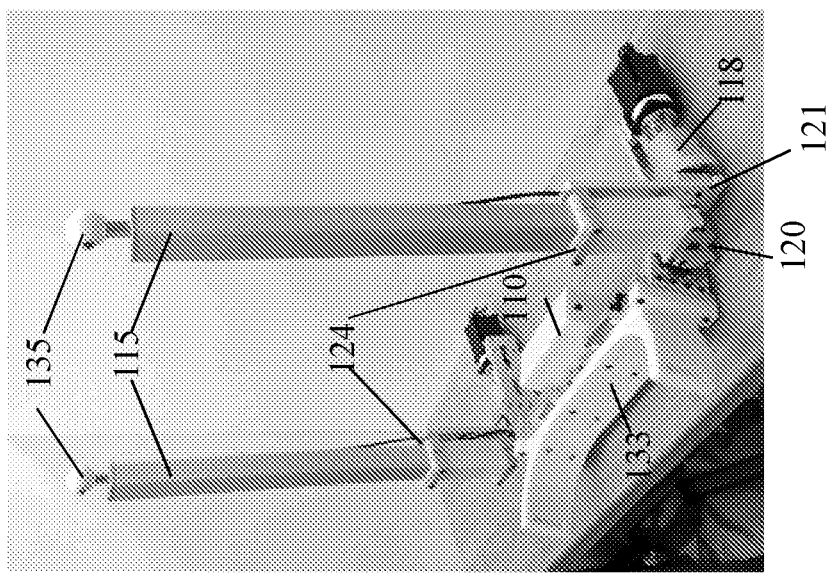

FIGS. 7 and 8 depict different views of an exemplary embodiment of the device 100 described in FIG. 1. In FIG. 7, the device 100 is laid flat on a surface, whereas in FIG. 8, the supernumerary artificial limbs 115 have been rotated to be perpendicular to the base structure 112. In addition to housing the processor 110 and sensors 105 in the base structure 112, this embodiment also includes a waist brace 133 configured to be coupled to a user's waist. The limbs 115 are coupled to the base structure 112 via two revolute joints 120 and 121, whose actuation rotates the limbs 115 in three-dimensional space. The limbs 115 also include prismatic joints 124, whose actuation causes a portion of the limb to expand or contract. Further, the limbs 115 have rubber spheres 135 coupled to their distal ends. These spheres 135 provide a high friction contact with surfaces in the environment.

Figure 9:
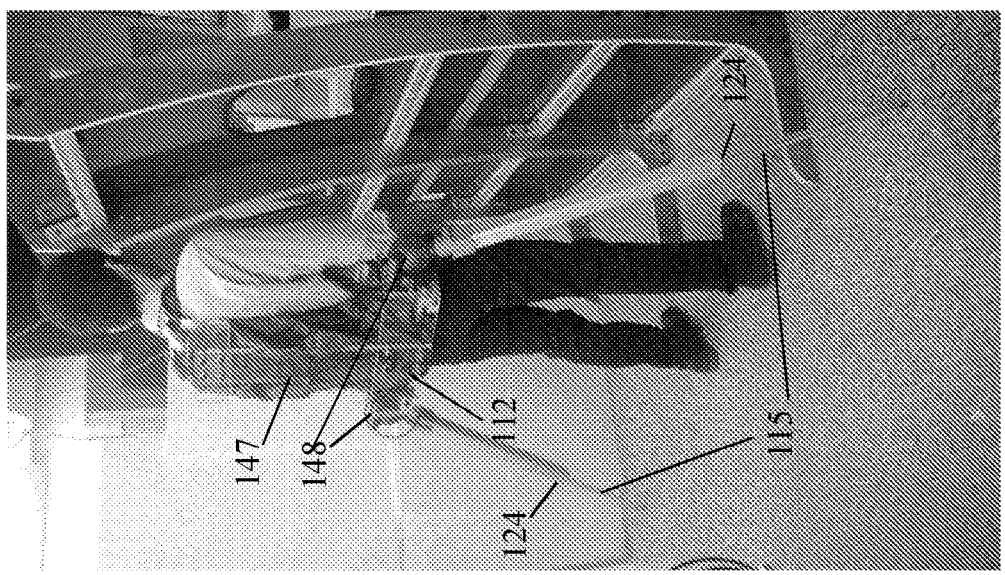

FIG. 9 depicts another exemplary embodiment of the device 100 described in FIG. 1. In this embodiment, the base structure 112 is coupled to a harness 147 with a waist belt and straps. The user can place his or her arms through the straps, tie the waist belt around his or her hips, and thereby couple the harness 147 to his or her back. In this manner, when the device 100 is worn, the base structure 112 is positioned proximate to the user's waist. Further, in this embodiment, the limbs 115 are coupled to the base structure 112 via ball joints 148, whose actuation rotates the limbs 115 in three-dimensional space. The limbs 115 also include prismatic joints 124, whose actuation causes a portion of the limb to expand or contrast.

Turning now to the operation of the device 100, the device 100 may first determine the load necessary to support a human body in a particular posture. When a user does not have the benefit of the device 100, the user must exert enough force and torque to support his or her own weight, and to counteract forces and torques based on their environment and circumstances. For example, if the user is operating a tool, the user must oppose the recoil that the tool generates. If the user is in a wind tunnel, the user must oppose the wind to remain upright. Since the user maintains his or her body in a posture via his/her legs, the cumulative forces and torques corresponding to the load on the user's body may be represented by cumulative measures at the user's hip. In some embodiments, these cumulative measures may account for a gravity load and inertial load of the both human body and the device 100 at the user's hip, as well as a torque around the user's hip.

Figure 10:
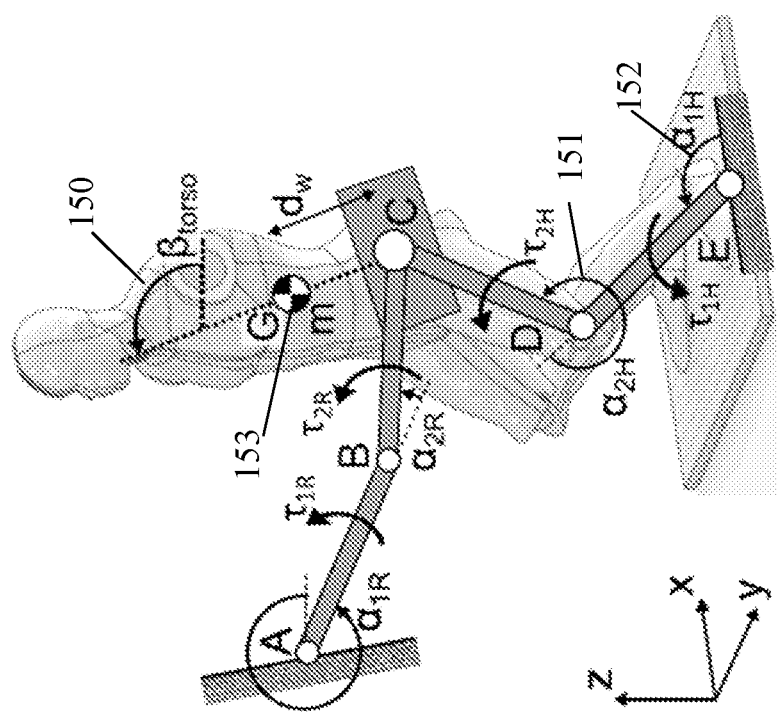
FIG. 10 depicts a schematic drawing of exemplary forces that influence the load of the human body.

The processor 110 may determine the load based on outputs from any type or combination of sensors 105 previously described. In one example, FIG. 10 depicts exemplary measurements that contribute to the load of the human body, which may be detected by one or more sensors 105. For example, the angle 150 of the human torso with respect to an x-axis of the environment, angle 151 of the knee, an angle 152 of the ankle, acceleration of the center of mass, and a position 153 of the center of mass may all be detected by sensors 105, or determined by the processor 110 by the output of such sensors 105.

Figure 11:
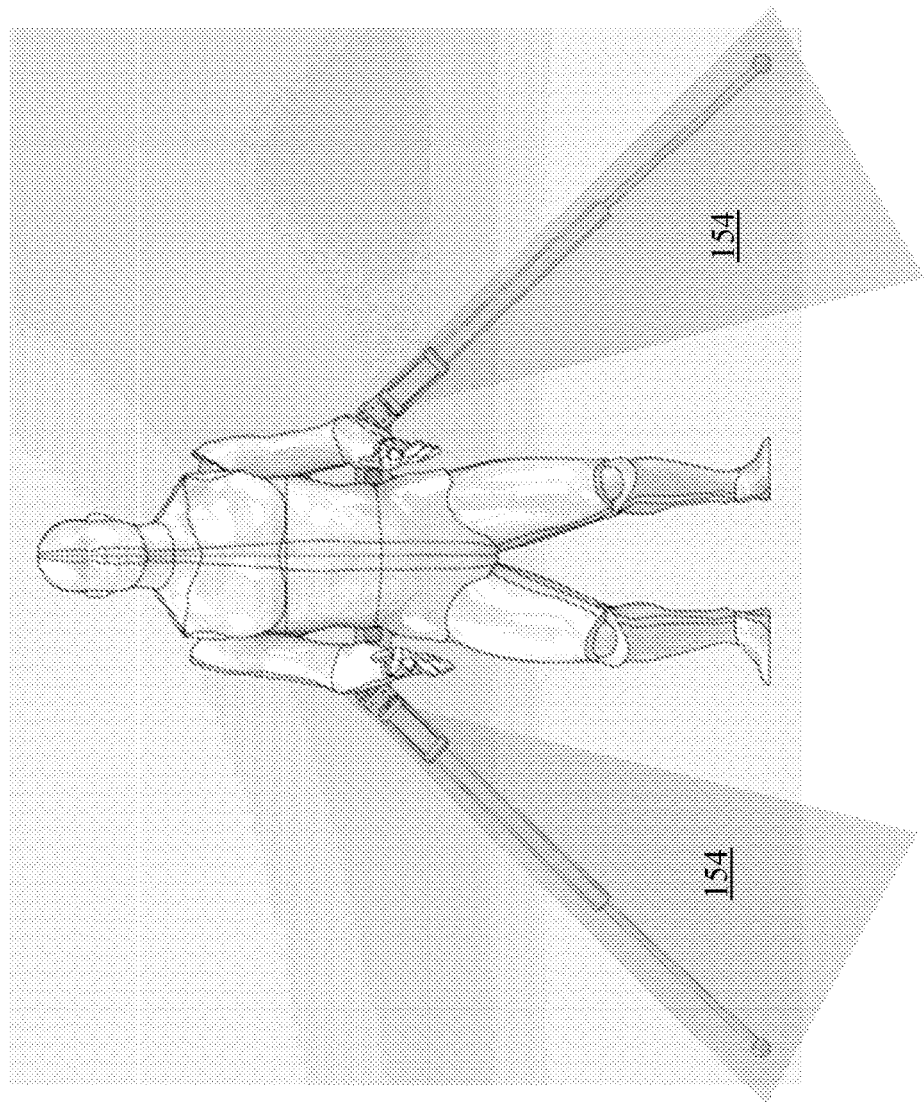
FIG. 11 depicts a schematic drawing of exemplary points of contact between the device described in FIG. 1 and an environment.

After determining the load, in some embodiments, the device 100 then identifies the set of positions that enable the supernumerary artificial limbs 115 to contact the immediate environment. In this manner, the device 100 may eliminate numerous positions from consideration because only positions that result in contact between the limbs 115 and the environment would be capable of supporting at least part of the body's load. For example, as demonstrated in FIG. 11, when a user is standing on a flat surface, the device 100 may determine the positions on the ground that are within the range 154 of the supernumerary artificial limbs' 115. In another example, when the user is standing in front of a workstation, the device 100 may determine positions on the workstation within the limbs' 115 reach, in addition to positions on the ground. Likewise, the device 100 may identify positions on a wall behind a user that the limbs 115 may contact.

In various embodiments, the device 100 may include cameras that capture images of the immediate environment. The processor 110 may analyze these images to detect objects and determine their relative positions to the base structure 112. In some examples, the processor 110 determines an object's distance from a particular location on the base structure 112 and angular displacement relative to that location. Since the device 100 may position the limb 115 against different locations on a detected object, the processor 110 may determine and store multiple distances and angular displacements corresponding to those locations. For example, if a user is climbing a ladder, the device 100 may detect the positions of different rungs relative to the base structure 112. If a user is standing next to a fence, the device 100 may detect the positions of posts and locations on the posts relative to the base structure 112.

Figure 12:
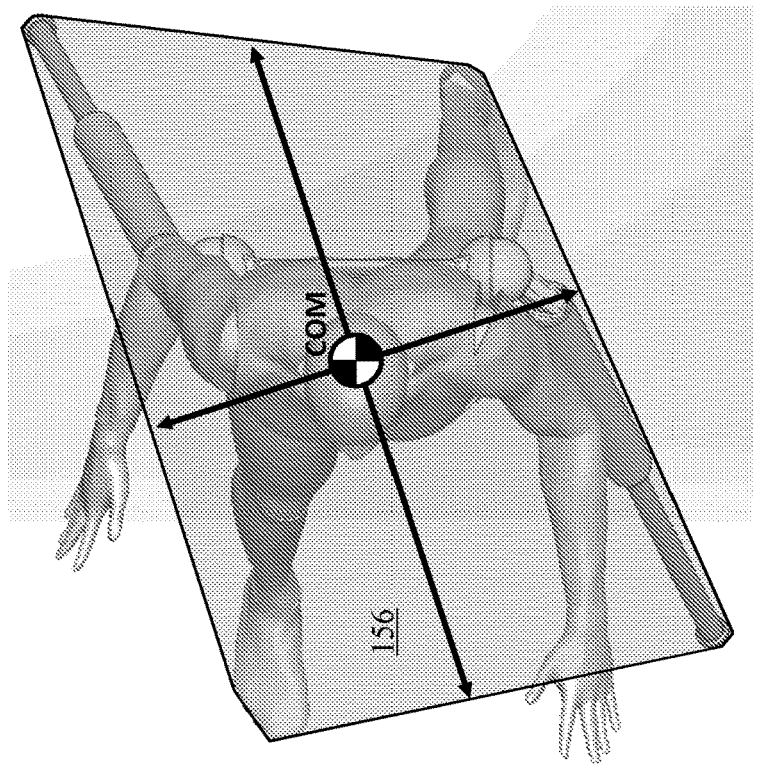
FIG. 12 depicts schematic drawings demonstrating the support provided to the center of mass of a human body by the supernumerary artificial limbs of the device described in FIG. 1 and the human's legs.
Figure 12:
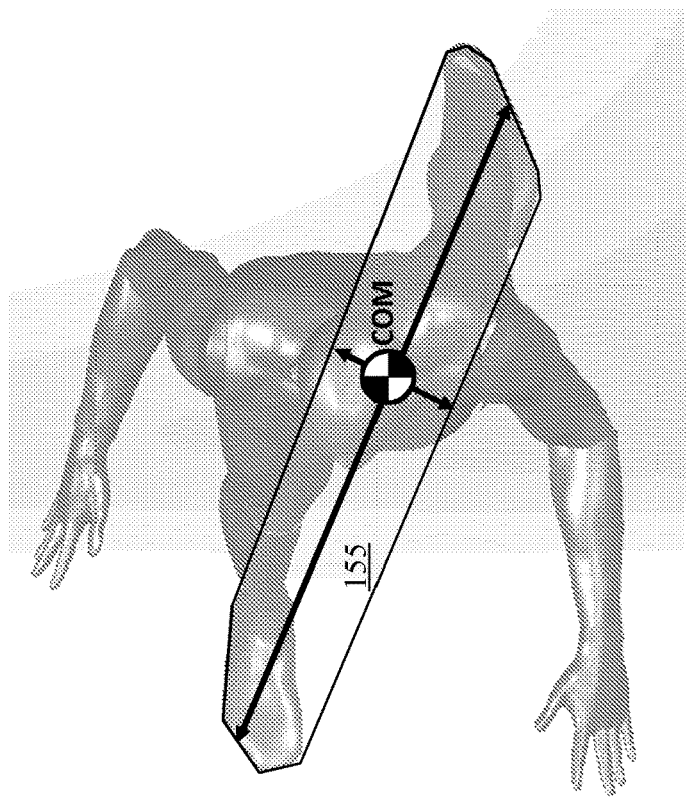

The device 100 may position the supernumerary artificial limbs 115 to attain different objectives for the user. In one example, the device 100 may increase the stability of the user's body. By way of example, FIG. 12 demonstrates conceptually how positioning the limbs 115 may increase a user's stability while he or she is walking. As depicted on the left, when a user does not wear the device 100, his or her torso is supported primarily by his or her legs. The positions of his or her legs and the center of mass of the user's body define a region 155 in which support is being provided to the user's torso. This region 155 may be represented as a polygon with different angles. When the user wears the device 100, as depicted on the right, his or her torso is supported by both legs and the artificial limbs 115, which defines a different region 156 in which support is being provided to the user's torso. Because this region 156 covers a polygon whose angles are more equal, the region 156 provides greater stability to the user's body. In this manner, by positioning the supernumerary artificial limbs 115 to contact the ground in opposition to the positions of the user's legs, the device 100 may increase the stability of the human body and prevent the user from falling over.

To determine the positions for the supernumerary artificial limbs 115 in this case, the device 100 may first determine the positions of the legs, using any of the sensors 105 and any of the methods described herein. In some embodiments, for each pair of possible positions for the limbs 115, the device 100 may determine the angles of the polygon 156 that would be formed by the possible positions of the limbs 115 and the actual positions of the user's legs. The device 100 may select the limb positions corresponding to the polygon 156 with the smallest range of angles. In other embodiments, the device 100 may determine the surface area of such polygons 156 and select positions corresponding to the largest surface area. The device 100 may determine the forces and/or torques for the limbs 115 to exert based on the load of the human body.

The device 100 also may include sensors 105 that measure the frequency and direction of the user's steps. Further, the device 100 may include a sensor 105 that estimates the length of the user's stride. The processor 110 may use this information to continually update the positions of the supernumerary artificial limbs 115, thereby anticipating the positions that will stabilize the user's body.

Another potential objective of the device 100 is to support the user's body in a prescribed posture. To complete various tasks, a user may need to assume a posture that requires continual exertion to maintain. For example, a user may squat, hunch over, or reach towards the ceiling. As a result, the user's legs may become fatigued before the user completes his or her tasks. In these situations, the device 100 may position the supernumerary artificial limbs 115 to support the load of the user's body, thereby relieving the user of some of the exertion needed to maintain his or her body in that posture.

Figure 14:
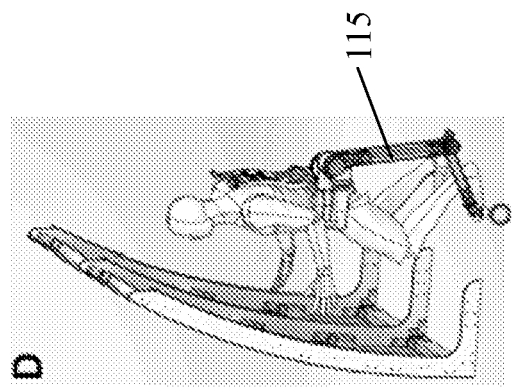
FIGS. 13-16 depict use examples of one or more supernumerary artificial limbs supporting a human body when proximate to a structure.
Figure 13:
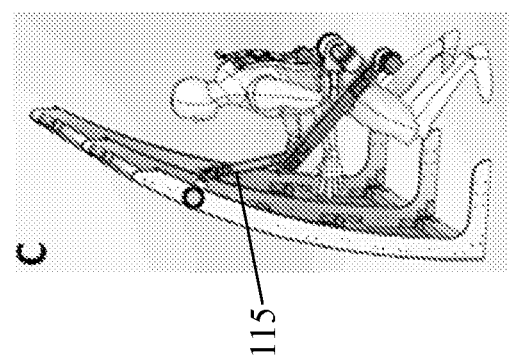
Figure 15:
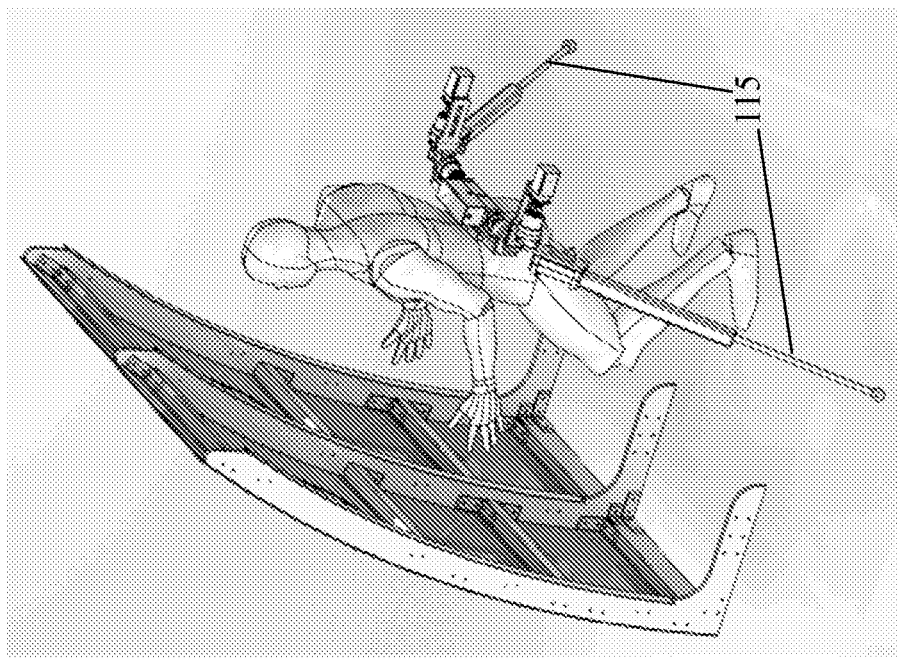
Figure 16:

To those ends, FIGS. 13-16 depict exemplary positions for artificial limbs 115 to support a user assuming a fatiguing posture when proximate to a structure, such as an airline structure. In FIG. 13, the device 100 has positioned a single artificial limb 115 to engage with the structure at a particular position. In FIG. 14, the device 100 has positioned a single artificial limb 115 to support the user via its contact with the ground. In FIG. 15, the device 100 has positioned two limbs 115 to support the user via two contact points with the ground. Finally, in FIG. 16, the device 100 has positioned two limbs 115 so that their hooks 130 engage with a bar on the structure above the user's hip, thereby providing support to the user's torso.

When selecting the position for the supernumerary artificial limb 115 in these cases, the device 100 determines the position that would minimize the exertion required by the user to maintain his or her body in the desired posture. The aggregated forces and torques required to support the user's body in the posture may be represented by $E_{ext}$. As discussed above, this aggregate measurement may account for at least a gravity load effectively associated with the center of mass of the user and device 100, based on at least the weight of the two. In some embodiments, the gravity load may be effectively associated with the center of mass of the user, the device 100, and any tools or attachments on the device 100. The aggregate measurement may also account for a cumulative torque around the user's hip. This aggregate may be borne by the exertion by the user's legs, $E_U$, and the exertion of the supernumerary artificial limb 115, $E_{SAL}$. Therefore, $$E_{ext} = E_U + E_{SAL}$$

Different combinations of values of $E_U$ and $E_{SAL}$ may satisfy this relationship and enable the user to maintain his or her body in a posture, and different positions, forces, and torques of the supernumerary artificial limb 115 may alleviate the exertion requirements of the user, in varying degrees. For example, the device 100 may determine the position, force, and torque for the supernumerary artificial limb 115 with the greatest amount of $E_{SAL}$, thereby minimizing the exertion (e.g., force, torque) required of the user, $E_U$.

Figure 17:
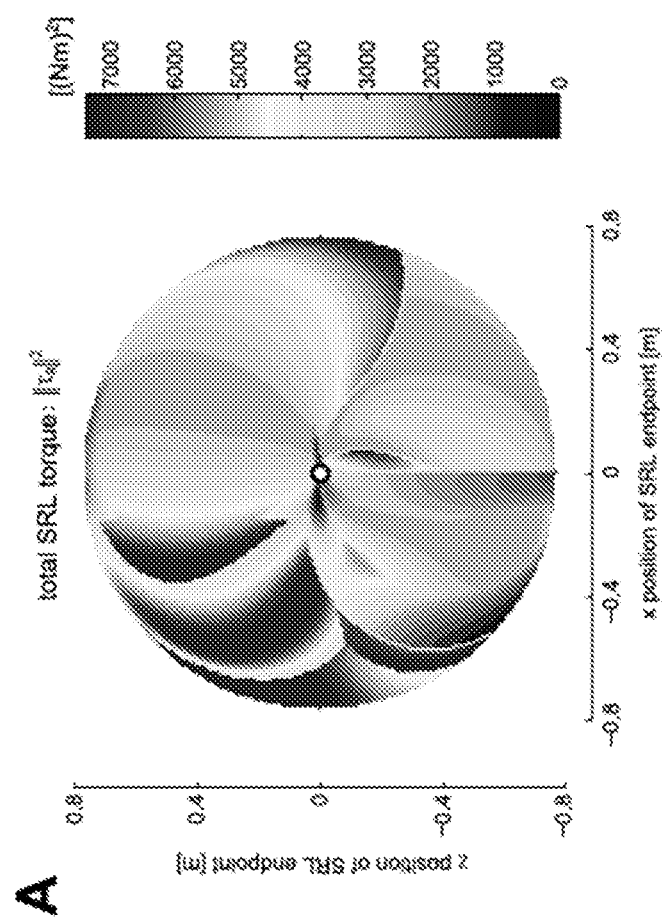
FIG. 17 depicts aggregated measures of the forces and torques exerted by a supernumerary artificial limb at different positions.

To identify this position, for each of the possible positions that the artificial limb 115 may assume, the processor 110 determines an aggregate measure of the forces and torques that the limb 115 would exert in that particular position. For the example depicted in FIGS. 13 and 14, where the user is positioned in front of an airline structure, the aggregated measures of the forces and torques that the limb 115 would exert at different positions is depicted in FIG. 17. The aggregate measure may be expressed as the total forces and torques exerted by each joint of the supernumerary artificial limb 115. Thus, the graph of FIG. 17 depicts values of $E_{SAL}$ for different potential positions of the artificial limb 115.

Figure 18:
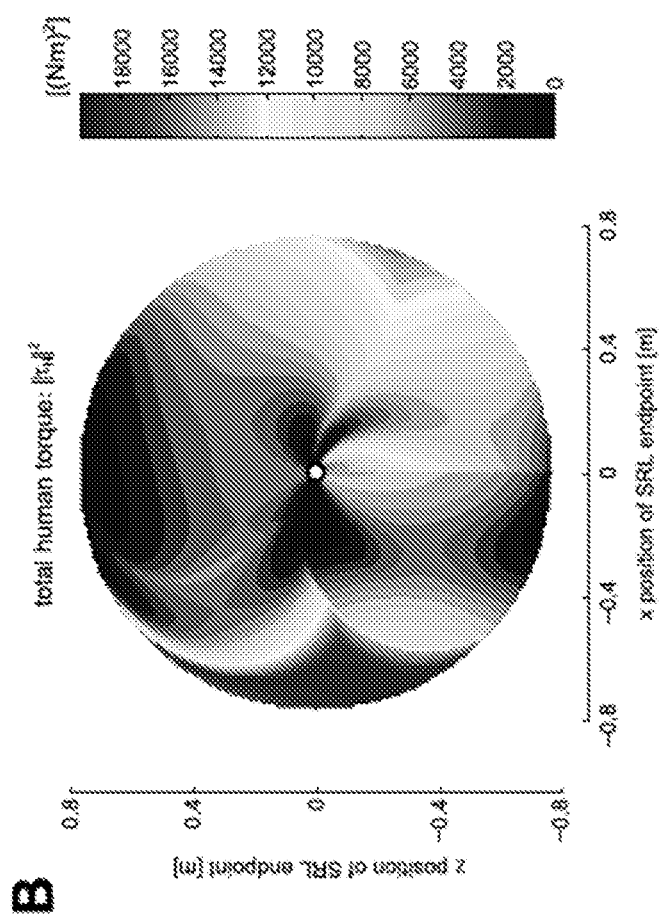
FIG. 18 depicts aggregated measures of the residual forces and torques exerted by a human body when the supernumerary artificial limb is moved into different positions.

Then, for each of the possible positions, the processor 110 determines an aggregate measure of force and torque that the user would need to exert if the limb 115 were moved into that position. For the example depicted in FIGS. 13 and 14, the aggregated measures of the residual forces and torques that the user would need to exert are depicted in FIG. 18. Thus, the graph of FIG. 17 depicts values of $E_U$ (i.e., $E_{ext}-E_{SAL}$) for different potential positions of the artificial limb 115. Further, this graph reveals regions of possible positions for the limb 115 that would reduce the exertion required by the user.

Figure 19:
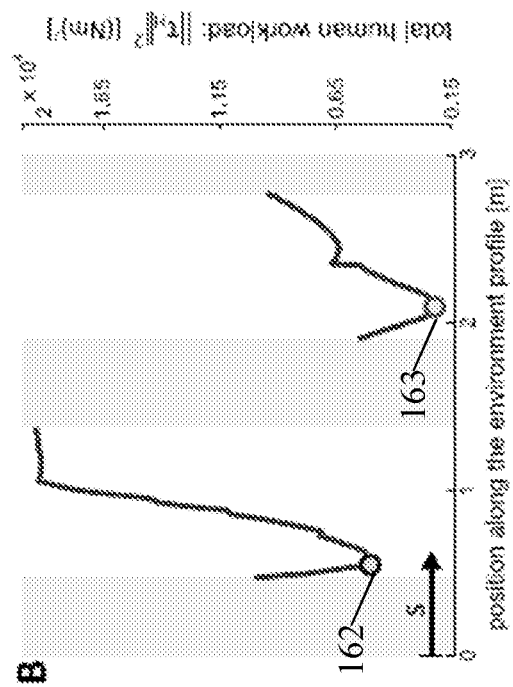
FIG. 19 depicts an outline overlaid on the graph of FIG. 17, the outline corresponding to positions for which the supernumerary artificial limb would contact an object in its immediate environment.

However, to actually provide support to the user, the device 100 must position the limb 115 where it will contact a surface in the user's environment (in this case, the airline structure or the ground). Therefore, the device 100 identifies the possible positions for which the limb 115 actually makes such a contact. Thus, FIG. 19 superimposes an outline of potential contact points in the user's immediate environment on the graph of FIG. 18, which depicts the forces required by the user when the limb 115 is moved into various positions. One arc 160 of the outline corresponds to positions on the airline structure within reach of the limb 115, whereas the other arc 161 corresponds to positions on the ground within the limb's 115 reach.

Figure 20:
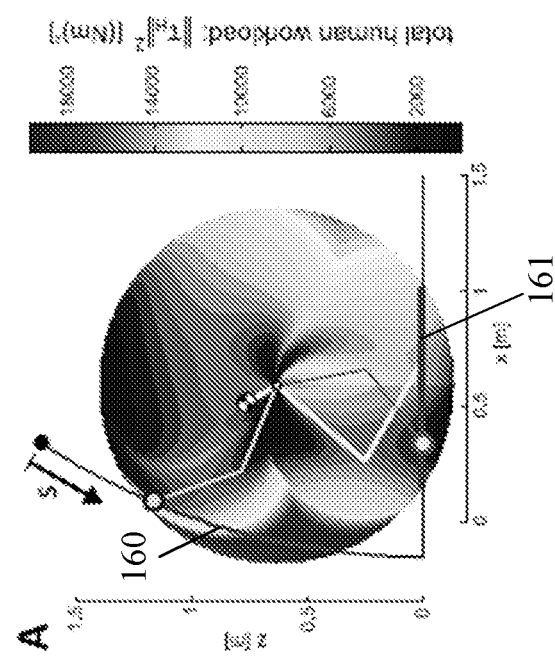
FIG. 20 depicts a graph of the aggregated measures of the residual forces and torques exerted by a human body, for different positions of the supernumerary artificial limb.

Of these positions, the processor 110 determines which position relieves the user of the greatest amount of exertion. FIG. 20 depicts a graph of the residual required exertion by the user for different potential positions of the supernumerary artificial limb 115, as gleaned by FIG. 19. In this graph, circles identify positions for the limb 115 that correspond to the minimal residual exertion required by the user, for the respective surfaces. For example, the circle 162 on the left corresponds to the position on the airline structure that minimizes the residual load supported by the user, and the circle 163 on the right corresponds to the position on the ground that minimizes this load. In some embodiments, if different positions result in the same reduction in load, the position that requires the supernumerary artificial limb 115 to exert less force and torque is selected.

In alternate embodiments, the device 100 may estimate the fatigue of the user's muscles and position the limbs 115 to reduce this fatigue as much as possible. For example, the processor 110 may estimate the fatigue of different muscles based on the load on the human body and data about the body's position that has been collected from the sensors 105. In another example, the processor 110 may collect data from EMG sensors 105 positioned on the user's body, and determine the fatigue of the particular muscles coupled to the EMG sensors 105. The processor 110 may evaluate the potential positions of the supernumerary artificial limbs 115 to determine positions that reduce the muscle fatigue as much as possible.

Figure 21:
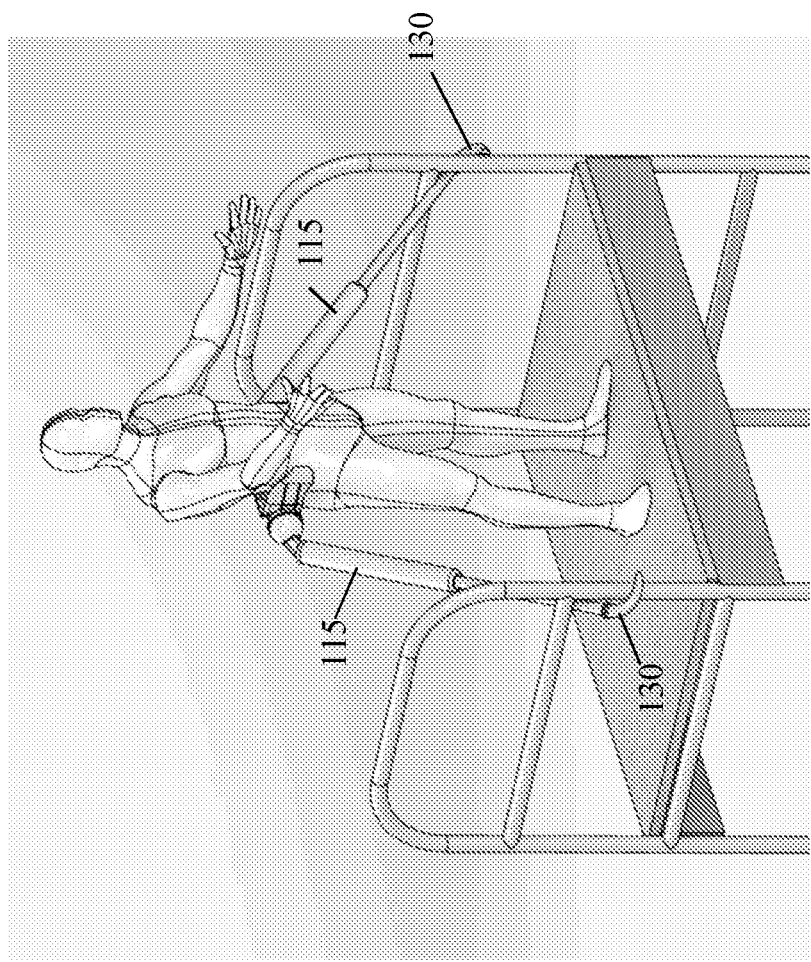
FIGS. 21-22 depict use examples of the device of FIG. 1 bracing a user against structures in the immediate environment, thereby stabilizing the user's position, when the user is stationary.
Figure 22:

Another potential objective of the device 100 is to brace the user's body using objects in the immediate environment, thereby increasing the body's stability. FIGS. 21-22 depict use examples in which the devices 100 have hooks 130 at the distal ends of the supernumerary artificial limbs 115, and the devices 100 have positioned the limbs 115 so that the hooks 130 engage objects in the surrounding environment. This engagement results in further points of contact between the user and his or her environment, thereby stabilizing the user's body within the environment. Such bracing may diminish the likelihood that a user will fall from, by way of example, a platform or other scaffolding. In another example, the bracing may suppress disturbances to the user's body. If a user is in a wind tunnel, bracing the user's body against a structure may help the user remain in place, by way of example.

In these embodiments, the device 100 may capture images, using cameras, of the user's immediate environment, analyze these images to detect objects that the artificial limbs 115 may engage, and determines the objects' distance and angular displacement relative to the base structure 112. Because the device 100 seeks to brace the user's body, the device 100 may attempt to identify positions for the artificial limbs 115 that are symmetrical about the center line of the user's body. As demonstrated in FIG. 21, when a user is standing upon a platform, the limbs 115 may be positioned so that their hooks 130 engage poles to the left and right of the user. Likewise, as demonstrated in FIG. 22, when a user is standing in front of a structure, the limbs 115 may be positioned so that their hooks 130 engage a bar on the structure at positions that are equidistant to the left and right of the user's center line.

After the device 100 processes the images and obtains information about the positions in which the limbs 115 contact the environment, the processor 110 may evaluate the positions to identify potential pairs of positions for the limbs 115 that are symmetrical across the user's center line. Referring again to FIG. 21, the processor 110 may identify two poles that may be equidistantly to the user's right and left, and then identify potential positions along the heights of the poles (e.g., 4 inches, 8 inches, or 12 inches below the user's hips, on both poles). Likewise, using the example in FIG. 22, after the device 100 detects horizontal bars in the airline structure, the processor 110 may identify pairs of positions along those bars that may be equidistant from the user's center line (e.g., 1 foot, 2 feet, or 3 feet to the right and left of the user's center line, on the bar).

For each pair of potential positions, the processor 110 may determine the forces and torques that would be exerted by the limbs 115 and subsequently, the residual forces and torques required by the user to maintain his or her position. The processor 110 selects the pair of positions associated with the smallest residual forces and torques for the user or the smallest cumulative estimated fatigue for the user's muscles. In some embodiments, the processor 110 may determine the positions such that the positions of the artificial limbs 115 and the user's legs would define a region with the largest surface area, as previously discussed in reference to FIG. 12. In further embodiments, the processor 110 may determine the positions that would define a region whose angles have the smallest range of degrees. The processor 110 would select the positions associated with the most advantageous region. In any of these embodiments, the processor 110 would then operate the limbs 115 to move into the selected positions and exert forces and torques at those positions. As the hooks 130 engage with objects in the environment, the additional points of contact for the user stabilize his or her body within the environment.

Figure 23:
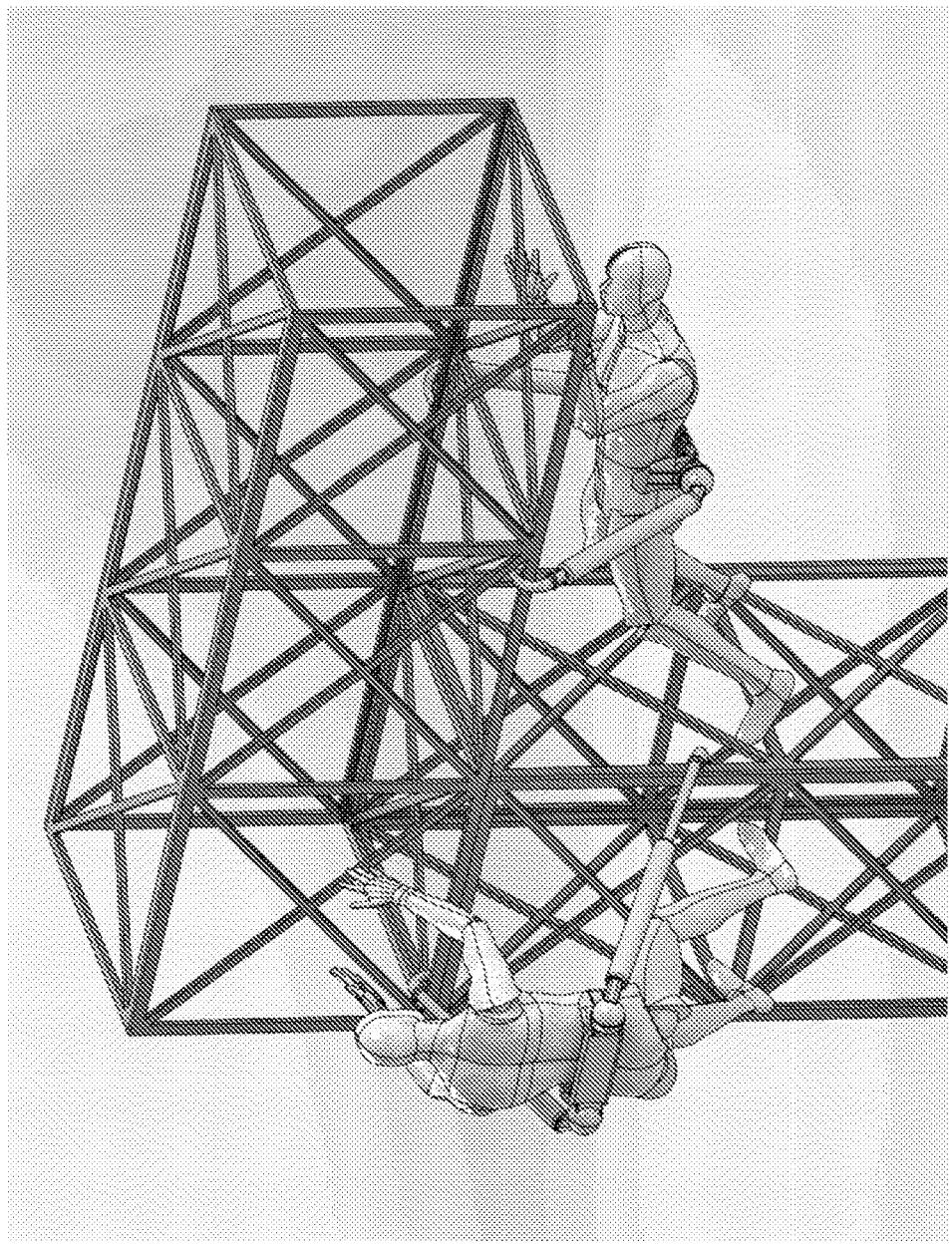
FIGS. 23-24 depict use examples of the device of FIG. 1 bracing a user against structures in the immediate environment, thereby stabilizing the user's position, when the user is in motion.
Figure 24:
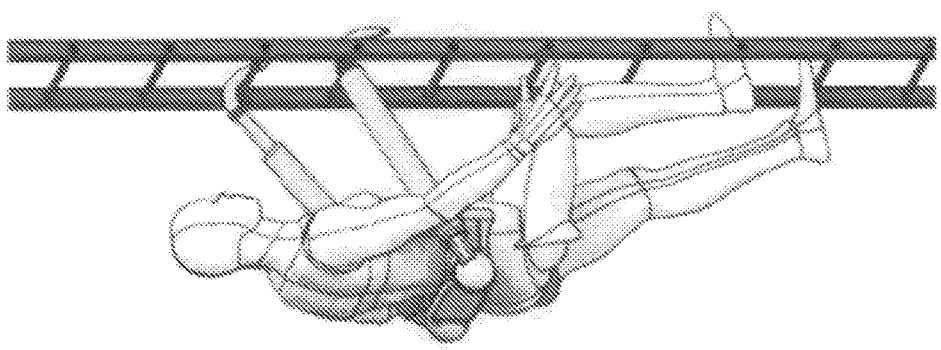

Another potential objective of the device 100 is to brace the user's body to different objects in the immediate environment as the user moves, providing further points of contact to the environment increases the body's stability. Further, in some situations, when the user pauses and remains stationary, the limbs' 115 hooks may support the user's body so that the user may use his or her hands to perform other tasks. FIGS. 23-24 depict use examples in which the devices 100 have hooks 130 at the distal ends of the supernumerary artificial limbs 115, and the devices 100 reposition the limbs 115 to engage the hooks 130 with different objects or different locations on objects as the user moves through an environment. As depicted in FIG. 23, as a user climbs a structure, the device 100 may reposition one or both limbs 115 to engage with the structure at different positions. When the hooks 130 suspend the user's body from the structure, the user may use his or her hands for other purposes. Further, in addition to providing support, the device 100 may enable a user to work in locations that would otherwise be unreachable or overly dangerous. As depicted in FIG. 24, as a user climbs a ladder, the device 100 may reposition the limbs 115 to engage with higher rungs as the user ascends.

To determine the positions, the device 100 may detect objects in the environment according to any of the methods described herein and identify positions on the objects that the hooks 130 may engage. The device 100 may determine the forces and torques required to maintain the body in its present position and select the positions that minimize the forces and torques that the user needs to exert, as described herein. As the user moves, the device 100 updates the forces and torques needed to maintain the body, re-evaluates the potential positions for the limbs 115 in light of the body's new location, and selects the positions that provide the most support to the user's body.

Figure 25:
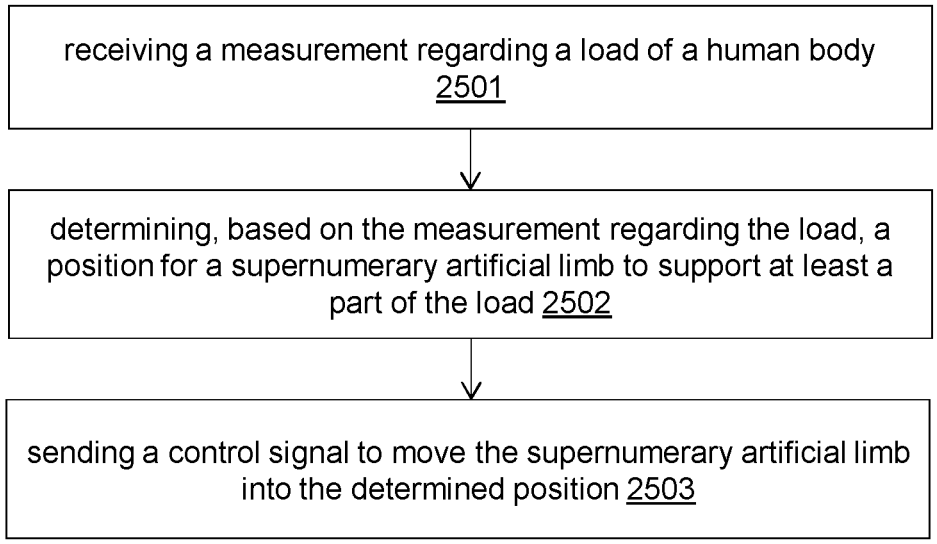
FIG. 25 depicts an exemplary flow diagram regarding the operation of the device of FIG. 1.

FIG. 25 depicts an exemplary, simplified flow diagram of a method for using the device described in FIG. 1. First, the method receives a measurement regarding a load of a human body (step 2501). The measurement may indicate a gravity load and torque or the inertial load and torque associated with the human body's waist or center of mass. The measurement may include joint angles on the human body (e.g., knees, ankles). The method also determines, based on the measurement regarding the load, a position for a supernumerary artificial limb to support at least a part of the load (step 2502). For example, the method may apply a control algorithm created by any of the steps described herein. The method also sends a control signal to move the supernumerary artificial limb into the determined position (step 2503). The control signal may operate an actuator 118 to position the limb.

Although various embodiments have been described herein in reference to supernumerary artificial limbs that may be coupled to a base structure, in some embodiments, the limbs may even be detached from the base structure. For example, the limbs may be positioned remotely from the user. In these embodiments, to obtain data for developing a control algorithm for the limb, the developer may assume different postures, position the supernumerary artificial limbs 115 to support, brace, or stabilize the developer's body, and record sets of data regarding sensor 105 measurements at the postures, the positions of the limbs 115, and the forces and torques exerted by the limbs 115 at those particular positions. For example, the developer may collect data to operate the artificial limb to assist a user in controlling machinery, such as construction equipment. By collecting data regarding the user's postures and related artificial limb behaviors in this manner, a developer may create a control algorithm for operating the artificial limb. Further industrial embodiments may be contemplated and fall within the scope of this disclosure. The developer may create the control algorithm according to principle component analysis and partial least squares regression.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. An apparatus comprising:
   a base structure configured to couple with a human body, the base structure including a sensor that obtains a measurement regarding a load of the human body;
   at least one supernumerary artificial limb having a proximal end and a distal end, the proximal end of the supernumerary artificial limb being coupled to the base structure; and
   a processor operatively coupled with the sensor, the processor configured to receive the measurement from the sensor, determine a position of the supernumerary artificial limb and/or a torque exerted by the supernumerary artificial limb based on the measurement regarding the load, generate a control signal based on the determined position and/or torque, and send the control signal to the at least one supernumerary artificial limb in order to change the position of the supernumerary artificial limb and/or the torque exerted by the supernumerary artificial limb based on the control signal, wherein the processor is configured to determine the position of the supernumerary artificial limb by:
   (i) determining a plurality of possible positions for the supernumerary artificial limb such that, for each possible position in the plurality of possible positions, a distal end of the supernumerary artificial limb would contact a surface of an environment if the supernumerary artificial limb were moved into that possible position, and selecting a position from the plurality of possible positions; or
   (ii) determining, for each position in a plurality of possible positions for the supernumerary artificial limb, an amount of support provided to a center of mass of the human body by the position of the supernumerary artificial limb and a position of a limb of the human body, and selecting the position associated with the largest amount of support.

2. The apparatus according to claim 1, wherein the processor is configured to generate the control signal to position the supernumerary artificial limb for bracing, supporting, or stabilizing the human body.

3. The apparatus according to claim 1, wherein the proximal end of the supernumerary artificial limb and the base structure are coupled with a ball joint.

4. The apparatus according to claim 1, wherein the supernumerary artificial limb comprises a rotational joint and a prismatic joint.

5. The apparatus according to claim 1, wherein the distal end of the supernumerary artificial limb comprises a hook or a frictional cap.

6. The apparatus according to claim 1, wherein the supernumerary artificial limb comprises an actuator that receives the control signal from the processor and actuates a joint to change the position of the supernumerary artificial limb based on the signal.

7. The apparatus according to claim 6, wherein the actuator actuates a rotational joint to change an angle of the rotational joint.

8. The apparatus according to claim 6, wherein the actuator actuates a prismatic joint to change an extension of the supernumerary artificial limb.

9. A method for supplementing a human body with a supernumerary artificial limb, the method comprising:
   receiving a measurement regarding a load of the human body;
   determining, based on the measurement regarding the load, a position for the supernumerary artificial limb and/or a torque to be exerted by the supernumerary artificial limb to support at least a part of the load, wherein determining the position of the supernumerary artificial limb comprises:
      (i) determining a plurality of possible positions for the supernumerary artificial limb such that, for each possible position in the plurality of possible positions, a distal end of the supernumerary artificial limb would contact a surface of an environment if the supernumerary artificial limb were moved into that possible position, and selecting a position from the plurality of possible positions; or
      (ii) determining, for each position in a plurality of possible positions for the supernumerary artificial limb, an amount of support provided to a center of mass of the human body by the position of the supernumerary artificial limb and a position of a limb of the human body, and selecting the position associated with the largest amount of support;
   sending a control signal to the supernumerary artificial limb, the control signal based on the determined position or torque; and
   operating the supernumerary artificial limb based on the control signal.

10. The method according to claim 9, receiving the measurement regarding the load of the human body comprises:
   receiving, from a sensor, the measurement associated with a joint angle of a limb of the human body, a position of a center of mass of the human body, a force exerted at a location on the human body, or any combination thereof.

11. The method according to claim 9, wherein determining the position or the torque comprises:
   determining the position or the torque for a supernumerary artificial limb for bracing, supporting, or stabilizing the human body.

12. The method according to claim 9, wherein determining the position for the supernumerary artificial limb comprises:
   determining the position for which force exerted from contact of a distal end of the supernumerary artificial limb against an environment is directed into a center of a ball joint of the supernumerary artificial limb, thereby preventing rotation of the ball joint.

13. The method according to claim 9, wherein determining the position of the supernumerary artificial limb comprises:
   determining, based on a center of mass of the human body and at least a position of a limb of the human body, the position of the supernumerary artificial limb.

14. The method according to claim 9, wherein determining the position of the supernumerary artificial limb comprises:
   determining, for each position in a plurality of possible positions for the supernumerary artificial limb, a region of support for a center of mass of the human body, the region of support bounded by the position of the supernumerary artificial limb and a position of a limb of the human body; and
   selecting the position associated with a region of support with the largest area.

15. The method according to claim 9, wherein determining the position of the supernumerary artificial limb comprises:
   determining a force exerted at a location on the human body, the force corresponding to a force required by the human body to maintain the body in a posture; and
   determining, for each position in a plurality of possible positions for the supernumerary artificial limb, an amount of the force that would be provided by the supernumerary artificial limb if the supernumerary artificial limb were moved into the position; and
   selecting the position associated with the largest amount of provided force.

16. The method according to claim 9, wherein determining the torque to be exerted by the supernumerary artificial limb comprises:
   determining an amount of torque required to maintain the body in the posture.

17. The method according to claim 9, wherein sending the control signal to the supernumerary artificial limb comprises:
   sending the control signal to an actuator of the supernumerary artificial limb that actuates a rotational joint of the supernumerary artificial limb.

18. The method according to claim 9, wherein sending the control signal to the supernumerary artificial limb comprises:
   sending a control signal to an actuator of the supernumerary artificial limb that actuates a prismatic joint of the supernumerary artificial limb.

* * * * *